Figure 1:
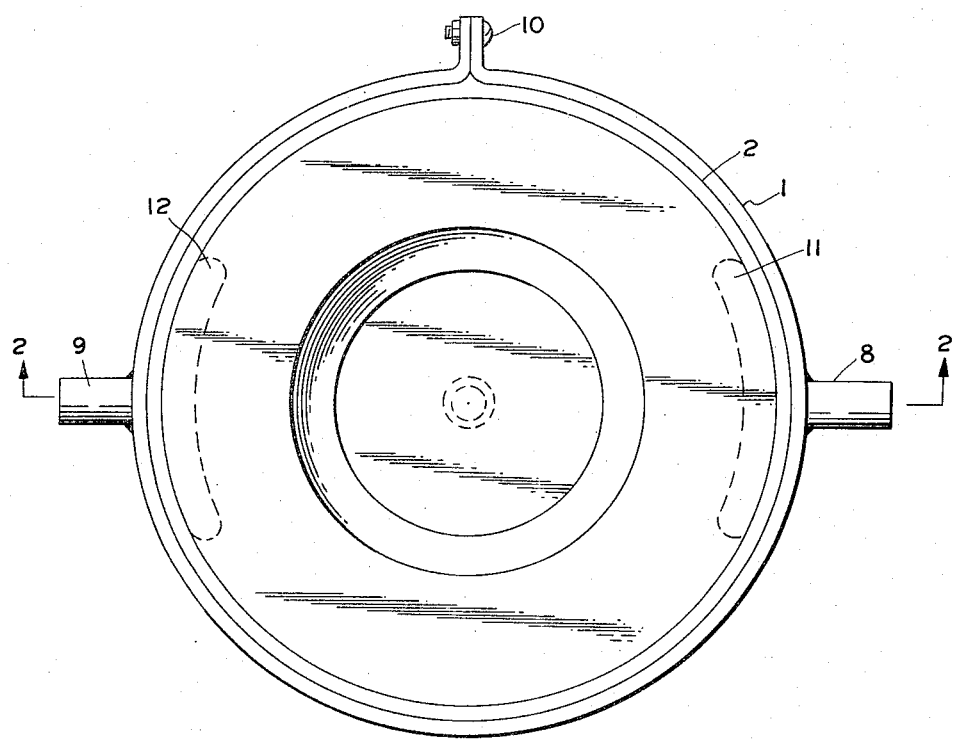

3,353,219
VACUUM-FORMING MOLD
Robert P. Snyder, Saginaw, Mich., assignor to The Dow Chemical Company, Midland, Mich., a corporation of Delaware
Filed Nov. 8, 1965, Ser. No. 506,634
6 Claims. (Cl. 18—35)

This invention relates to a novel vacuum-forming mold, and more particularly, it relates to a vacuum-forming mold having an integral heat exchange layer.

One of the techniques of fabricating shaped articles from sheet materials is the "vacuum-forming" method, in which a vacuum is applied to pull a sheet material against the face of a forming die and to hold it in place until the sheet material is caused to assume the shape of the mold as a permanent set. If the sheet material is a thermoplastic substance, the shaped article may be merely cooled in order to assume a permanent set. If, on the other hand, the sheet material is made from a thermosetting substance, it may be necessary to heat the article while it is in the mold in order to make it assume a permanent set. Still other procedures might require that the sheet material undergo a chemical reaction in order to acquire the permanent set. The primary purpose of this invention, however, is to deal with a vacuum-forming operation in which a heat exchange step is employed, preferably for the purpose of forcing the formed material to acquire a permanent set.

It is an object of this invention to provide a novel vacuum-forming mold. It is another object of this invention to provide a vacuum-forming mold having a means for circulating a heat exchange fluid near the mold surface. It is still another object of this invention to provide a vacuum-forming mold with a means for supplying a heat exchange fluid to the vicinity of the mold face, the mold being made from materials of construction which can be shaped manually and hardened by curing in air. Still other objects will appear from the more detailed description of this invention which follows.

The foregoing objects are accomplished in accordance with this invention by providing a vacuum-forming, four-layer mold for imparting shape to a sheet material, which comprises (1) a fluid-impervious, support layer covered with (2) a thick, porous, rigid layer of coarse particles, (3) a thin, fluid-impervious, sheet material covering said thick layer, and (4) a thin, porous, rigid layer of fine particles covering said fluid-impervious sheet and being shaped so that its free surface is the molding surface for imparting shape to a sheet material, a passageway for connecting a vacuum-producing means to the interface between said thin layer of fine particles and said fluid-impervious sheet, and a means for causing a heat exchange fluid to flow into, through, and out of said thick, porous layer. In the preferred mode of embodiment of this invention, the support layer is a solid, filled, epoxy resin composition, the thick layer of coarse particles comprises aluminum particles coated with epoxy resin, the fluid-impervious sheet is aluminum foil, and the thin layer of fine particles comprises heat-sintered, bronze particles.

Figure 2:
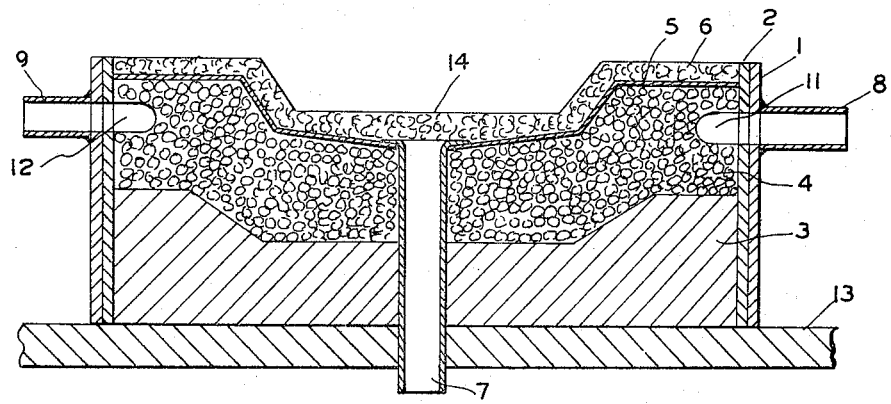

The invention may be more fully understood by reference to the attached drawings, in which FIGURE 1 is a plan view of the vacuum-forming mold of this invention and FIGURE 2 is a cross-sectional view in elevation taken along line 2—2 of FIGURE 1.

In FIGURES 1 and 2, a mold is shown having cylindrical walls with the upper surface being the face of the mold which imparts shape to a sheet material. It is to be understood that the contours of the mold face and the shape of the walls are not critical parts of the invention and that any desired configuration incorporating the essential features of this invention is included in the scope of the vacuum-forming molds of this invention. Cylinder 1 and gasket 2 in combination with base plate 13 form a container in which the vacuum-forming mold may be constructed by casting techniques. Cylinder 1 may be a ring clamp with a tightening means 10 such as a bolt and nut.

The actual mold is made of four, separate, superposed layers. The bottom layer 3 may be any load bearing rigid structure, which is impervious to fluids. Such materials might include wood, metal, cement, plastic, and the like. The next layer is a relatively thick layer of coarse particles bonded together in such a fashion as to produce a porous structure. This layer 4 functions as a conduit for a heat exchange fluid which enters the layer via inlet 8 and leaves via outlet 9. When the heat exchange fluid is to be a coolant, the fluid might, for example, be water, and when the heat exchange fluid is to function as a heating medium, the fluid might, for example, be steam. It is, of course, understood that the fluid, whether it be for purposes of heating or cooling the material being molded, may be either a liquid or a gaseous material capable of flowing through layer 4 with relatively small pressure drops due to friction of the fluid flow. In order to distribute the flow of fluid as evenly as possible through layer 4, a feed manifold 11 is provided to distribute such fluid entering through inlet 8. In a similar fashion, an exit manifold 12 is provided to collect the fluid leaving layer 4 and to conduct it into outlet 9. These manifolds may take any of various forms but it is sufficient in many embodiments of this invention (as is shown in FIGURES 1 and 2 of the drawings) merely to provide a cavity for each of the two manifolds.

Superposed onto layer 4 is a fluid-impervious sheet 5 which serves to prevent the heat exchange fluid in layer 4 from flowing into layer 6. Since there is a heat exchange operation taking place, sheet 5 should be a good heat conductor and, therefore, preferably is a sheet of aluminum, copper, steel, or other heat conducting metal.

The uppermost portion of the mold is layer 6 which is both rigid and porous and is prepared from a mass of fine particles. A preferred material for this purpose is sintered bronze particles although any of several other types of materials may be employed for this purpose. Layer 6 must be sufficiently porous to apply a vacuum to its lower surface and have that vacuum transmitted through the layer to the upper surface 14 which, in turn, functions as the shape-imparting mold face. Layer 6 must also be a relatively good heat conductor since it is employed in the transmission of heat between the heat exchange fluid in layer 4 and the sheet material being vacuum-formed on upper surface 14. Since a vacuum is a good heat insulator, it is important that the structure of layer 6 be able to conduct heat quickly and efficiently through the layer. Metal particles are therefore preferred as the material of construction for layer 6. The particles which are employed in making layer 6 should be as fine as possible so that the upper forming surface 14 is sufficiently smooth to prevent the formation of any surface irregularities on the finished article.

The vacuum, which is employed in the forming operation may be supplied in any of various alternative methods, although in the attached drawings a conduit 7 is positioned centrally in the mold so as to pull a vacuum from the interface between layer 6 and in fluid-impervious sheet 5.

It may be seen that, while any of several materials can be employed to prepare the vacuum-forming mold of this invention, it is possible and, in many embodiments, preferable to employ materials which can be formed and shaped by hand and which do not require any expensive machining operations. For example, cylindrical walls 1 and 2 can be mounted on base plate 13 with vacuum conduit 7 soldered rigidly in place. Into the container formed by these components may be poured a liquid epoxy resin composition, which may be filled with any of various materials so as to produce a solid, fluid-impervious structure when that composition sets. When support layer 3 has hardened, it may be covered with a relatively thick layer 4 of epoxy coated aluminum particles which can be hardened by the application of heat to a load bearing porous structure. Over this layer of aluminum particles may be placed a copper sheet which can be soldered in place in order to seal it around gasket 2 and around vacuum conduit 7. In place of the copper sheet one can employ a thickened epoxy resin filled with aluminum powder, or other heat conducting metal particles. Such a material can be applied over layer 4 in the manner of paint or putty to produce a thin, heat conducting, fluid-impervious layer 5. On the top of that fluid-impervious layer 5, whether it be a metal sheet, a filled epoxy resin as described above, or other suitable material, is placed a thin layer of bronze particles which can have its upper surface 14 formed into the proper shape by a suitable pattern, and the entire structure hardened by the application of heat. Since each of layers 3, 4, 5, and 6 is a load bearing structure, it is apparent that the entire mold is a strong, rigid construction.

In the operation of the vacuum-forming mold of this invention a heated thermoplastic sheet material may be placed over the upper surface 14 of the vacuum-forming mold shown in the attached drawings. A vacuum is then produced through conduit 7 which is transmitted through layer 6 and pulls the sheet material against surface 14 causing it to conform exactly to the shape of that surface. If, as is the usual case, the thermoplastic material is set by cooling it from its heat-softened condition, a cooling fluid such as water, air, or other suitable fluid is passed through layer 4, extracting heat from the thermoplastic sheet held against surface 14 until that sheet has assumed a permanent set. The vacuum is then released and the shaped article removed from the mold, leaving the mold for the application of the next sheet material to be formed. If the sheet material requires heat to cause it to assume a permanent set, the operations described above are precisely the same, except that the heat exchange fluid which is passed through layer 4 is a hot fluid such as steam, hot air, or other heating medium which can transfer heat to the sheet material and thereby cause it to assume a permanent set.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A vacuum-forming, four-layer mold for imparting shape to a sheet material which comprises (1) a fluid-impervious support layer covered with (2) a thick, porous, rigid layer of coarse particles, (3) a thin, fluid-impervious sheet material covering said thick layer, and (4) a thin, porous, rigid layer of fine particles covering said fluid-impervious sheet and being shaped so that its free surface functions as the molding surface for imparting shape to a sheet material, a passageway for connecting a vacuum-producing means to the interface between said thin layer of fine particles and said fluid-impervious sheet, and a means for causing a heat exchange fluid to flow into, through, and out of said thick, porous layer.

2. The mold of claim 1 in which said layer of fine particles is a good heat conductor.

3. The mold of claim 1 in which said thick layer of coarse particles comprises metal particles bonded with an epoxy resin.

4. The mold of claim 1 in which said fluid-impervious sheet is a metal foil.

5. The mold of claim 1 in which said fluid-impervious sheet is a layer of metal filled resin.

6. The mold of claim 1 in which said support layer is a solid, filled, epoxy resin; said thick layer of coarse particles comprises aluminum particles coated with epoxy resin; said fluid-impervious sheet is aluminum foil; and said thin layer of fine particles comprises heat-sintered bronze particles.

References Cited

UNITED STATES PATENTS

| | | | |
|---|---|---|---|
| 2,907,070 | 10/1959 | Van Hardesveldt | 25—130 X |
| 2,926,385 | 3/1960 | Willson | 18—19 X |
| 3,078,508 | 2/1963 | Martin. | |
| 3,166,467 | 1/1965 | Reifers et al. | 264—87 X |
| 3,166,615 | 1/1965 | Farrell | 264—123 X |
| 3,262,159 | 7/1966 | Falkenau et al. | |

J. SPENCER OVERHOLSER, *Primary Examiner.*

J. HOWARD FLINT, JR., *Examiner.*